Oct. 12, 1965
W. C. JONES
3,211,197
EDGE STRAIGHTENING DEVICE
Filed May 9, 1963
2 Sheets-Sheet 1
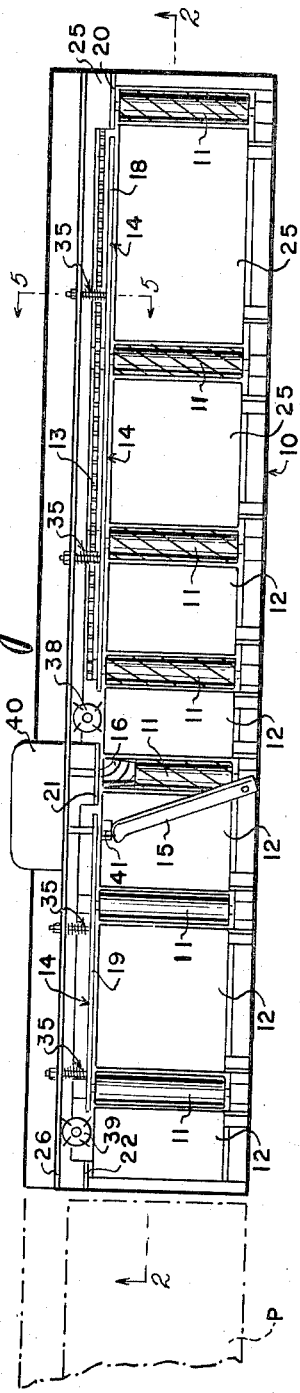
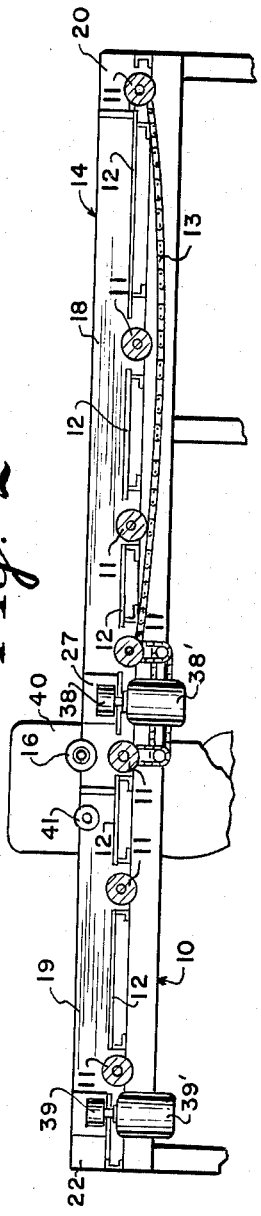
INVENTOR.
WILLIAM CARL JONES
BY
Newton, Hopkins & Jones
ATTORNEYS Oct. 12, 1965  W. C. JONES  3,211,197
EDGE STRAIGHTENING DEVICE
Filed May 9, 1963  2 Sheets-Sheet 2

INVENTOR.
WILLIAM CARL JONES
BY
Newton, Hopkins & Jones
ATTORNEYS

United States Patent Office 3,211,197
Patented Oct. 12, 1965

3,211,197
EDGE STRAIGHTENING DEVICE
William Carl Jones, Nacogdoches, Tex., assignor of fifty percent to Temple Industries, Inc., a corporation of Texas
Filed May 9, 1963, Ser. No. 279,150
8 Claims. (Cl. 144—117)

The present application is a continuation-in-part of my co-pending application Serial No. 140,179, filed September 20, 1961, now abandoned.

This invention relates to lumber dressing apparatus, and is more particularly concerned with an edge straightening device to remove the bow from a board so that the board can be planed, or dressed, to be a straight board.

After lumber is sawed out, it is frequently allowed to sit for a period of time. During this time, some of the boards may become warped, or bowed. The boards that become bowed are normally down graded, which causes them to sell for a lower price. Even with the usual planing operation to provide dressed lumber, the bow is not removed from the lumber because the board is guided by its edge; and if that edge be bowed or curved, the dressed lumber is bowed accordingly.

The device of the present invention overcomes the above stated problem by providing, in combination with the standard planer feed table, a plurality of stationary guide walls. Between the stationary guide walls are movable walls. At the end of the movable walls are cutting means, the outer cutting surfaces of which are aligned with the stationary guide walls. Thus, portions of a bowed board will depress the movable walls and come into contact with the cutting means which cut off all portions of a board that deviate from a certain line.

It is therefore an object of the present invention to provide an edge straightening device for lumber that has become bowed.

It is another object of the present invention to provide an edge straightening device for lumber that will not affect boards having a straight edge.

Another object of the present invention is to provide a method of straightening the edge of a board.

A further object of the present invention is to provide an attachment for a standard planer feed table that will straighten the edge of a board and feed the board into the planer along a straight path.

And another object of the present invention is to provide an edge straightener for lumber which is simple and efficient in operation, durable in structure, and well designed to be manufactured economically.

Other and further objects, features and advantages of the present invention will become apparent from consideration of the following specification when taken in conjunction with the accompanying drawings in which:

FIG. 1 is a top plan view of a device constructed in accordance with the present invention.

FIG. 2 is a longitudinal cross sectional view taken substantially along the line 2—2 in FIG. 1.

Figure 3:
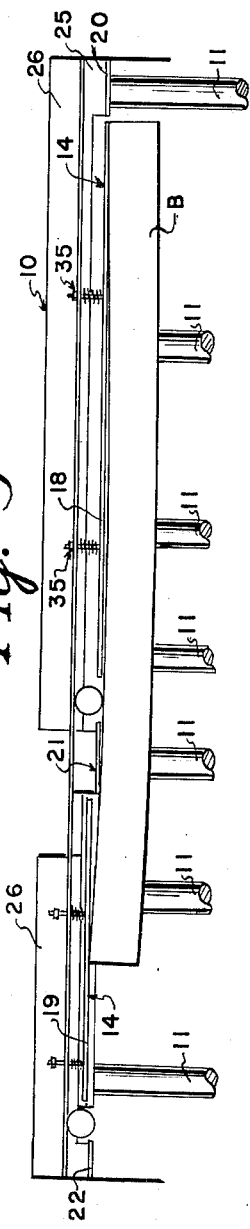
FIG. 3 is a schematic view showing a bowed board before it contacts the cutters.

In general terms the device of the present invention comprises means for holding portions of a board along a line while allowing other portions of the board to project past that line. Cutting means are provided, also on the line, and arranged to cut off all portions of the board that project past the line. This gives a straight edge on the board, aligned with the line.

Referring now more particularly to the drawings and to that embodiment here chosen by way of illustration, the device includes a table 10 having feed rollers 11 mounted transversely of the table and journalled for rotation about their axes. The rollers 11 are driven, as by a chain 13, from the housing 40. Plates 12 are mounted between the rollers 11 to provide a relatively solid table top to prevent the boards from passing down between the rollers 11.

At one side of the table 10 is a guide wall 14. The guide wall 14 is adjacent the ends of the feed rollers 11 so a board B can slide along the guide wall 14 and be carried along by the feed rollers 11. The guide wall 14 is perpendicular to the axis of the feed rollers 11; therefore, the travel of the boards is parallel to the guide wall 14.

Means are provided to urge the boards against the guide wall 14. In the embodiment here shown, two separate devices are used. An arm 15 is pivotally mounted on the table 10, and is spring urged to rotate in a clockwise direction as viewed in FIG. 1. It will thus be seen that the boards B will be pushed by the arm 15 toward the guide wall 14. Devices such as arm 15 are well known in the art, and are generally used on planer feed tables; therefore, no detailed description is deemed necessary.

In addition to the arm 15, there is a roller known as a pineapple roller to urge the boards against the guide wall 14. The pineapple roller 16 is a frustoconical roller having helical grooves in its surface. The pineapple roller 16 is driven so that the helical grooves urge the board toward the guide wall 14. The construction and operation of the pineapple roller is well known in the art and should be understood with the above description.

The guide wall 14 is made up of a plurality of sections, some being movable and some being stationary. In the embodiment here shown there are two movable sections including a rear movable section 18 and a front movable section 19. Three stationary sections alternate with the three movable sections. At the rearmost end (or the entrance end) is a stationary section 20, between the two movable sections 18 and 19 is a stationary section 21; and, at the forwardmost (or exit) end is a third stationary section 22.

Though the exact structure to provide the guide wall 14 may take various forms, in the embodiment here shown there is a channel shaped member having a central web 25, an outside arm providing a wall 26, and an inside arm providing the guide wall 14.

The stationary sections 20, 21 and 22 of the guide wall 14 are formed integrally with the channel member; and, the movable sections 18 and 19 are separate from the channel members and supported from the wall 26.

Figure 5:
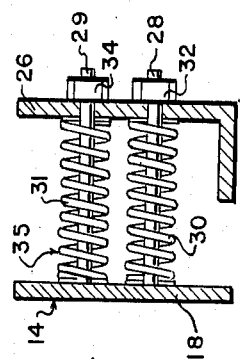
FIG. 5 is a cross sectional view taken substantially along the line 5—5 in FIG. 1.

The supporting structure for the movable sections 18 and 19 is shown in detail in FIG. 5. A pair of bolts 28 and 29 is secured to the movable plate, as plate 18, by welding or the like. The bolts 28 and 29 project toward the inside of the channel member, passing through appropriate holes in the wall 26. Springs 30 and 31 surround the bolts 28 and 29 respectively between the wall 26 and the movable section 18 to urge the movable section 18 inwardly of the table 10. Nuts 32 and 34 threadably engage the bolts 28 and 29 respectively to limit the movement of the section 18. The nuts 32 and 34 should be adjusted so that the section 18 is normally aligned with the stationary sections 20, 21 and 22. A straight guide wall 14 is thereby provided.

It will thus be seen that the movable section 18 can be depressed by overcoming the tension of the springs 30 and 31; but, the return movement is limited by the nuts 32 and 34. While one particular support has been described, it will be understood that a plurality of such supports is used on both section 18 and section 19. The supports, as the one shown in FIG. 5, are generally designated at 35.

In FIGS. 1 and 2 it will be seen that the movable sections 18 and 19 do not extend entirely to the succeeding stationary sections 21 and 22 respectively; rather, there is a space between movable section 18 and stationary section 21 and between movable section 19 and stationary section 22. Behind the spaces mentioned, there are cutting means 38 and 39. The cutting means 38 and 39 are here shown as circular cutting heads such as are ordinarily used in various planing or joining machines; however, it should be realized that numerous cutting devices can be used, such as circular saws, band saws or the like. Motors 38' and 39' are mounted below the top of the table 10 and carry the cutting heads 38 and 39 directly on their shafts.

About in the center of the table 10, there is a housing 40 which contains a conventional driving means. A shaft from the housing 40 supports the pineapple roller 16 above described. Another shaft from the housing 40 carries an outfeed roller 41. The outfeed roller 41 is mounted on the forward side of the pineapple roller and is spaced upward from the feed rollers 11 a distance approximately equal to the thickness of boards being run through the machine. The purpose of the outfeed roller 41 will be discussed later.

Figure 4:
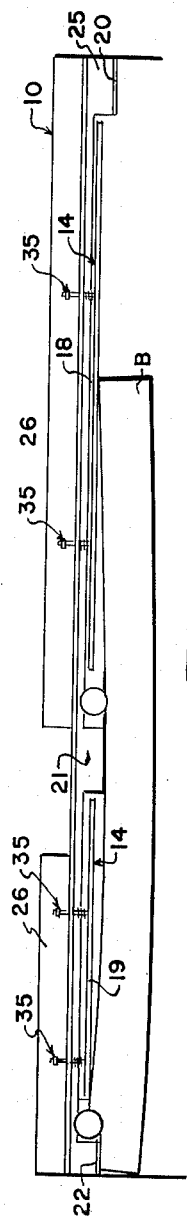
FIG. 4 is a view similar to FIG. 3 showing the board in contact with the cutters.

In operation, a curved or bowed board is placed on the table 10 with the concave side of the board adjacent the wall 14. Henceforth, a better understanding will be had by referring to FIGS. 3 and 4 of the drawings.

As the board B travels along the table 10, carried by the rollers 11, the board is engaged by the pineapple roller 16 which urges the board B toward the wall 14. As the board moves on, the arm 15 also engages the board B to help to keep the board against the guide wall 14; then, the outfeed roller 41 engages the board. Since the board is now pushed firmly against the wall 14, there will be a considerable amount of frictional drag; and the roller 41 aids in driving against that drag. Also, the board will soon engage the cutting means, causing additional drag which must be overcome.

Initially, the board B will ride on the stationary sections 20 and 21 which will keep the board away from the cutting means; however, when the board is positioned so that the apex of the concavity is centered on the middle stationary section 21, the outwardly projecting ends of the board will depress the movable sections 18 and 19 of the guide wall 14. Now, as the board moves on, the rear cutter head 38 will engage the board close to the mid-section of the board and cut off that portion of the board which projects past the guide wall 14. Later, after the board has moved further, the forward end of the board will engage the cutter head 39 which will cut off that portion of the board projecting past the guide wall 14.

As mentioned above, the extremities of the cutting heads are aligned with the stationary sections of the guide wall 14; hence, the portions of the board that project past the wall 14 will be cut off even with the wall 14. This gives a straight edge on one side of the board. This straight edge can now be fed through to the planer P where the board is guided by the straight edge and planed accordingly.

From the above description it should be realized that the movable sections 18 and 19 of the guide wall 14 serve only to aid in positioning the board B on the stationary section 22 of the guide wall 14. It is this positioning that is essential to the proper operation of the device, and other guide portions assist only in attaining this positioning of the board.

When the board engages the rear cutter 38, the load on the cutter is gradual because the cutter first engages the board close to the apex of the curve. When the board engages the forward cutter 39, on the other hand, the end of the board engages the cutter with the maximum amount of material to be cut first. In view of this difference in loading of the cutters, the motor 39' driving the forward cutter 39 should be larger than the motor 38' driving the rear cutter 38. In one successful embodiment of the invention, the forward motor is a 15 horsepower electric motor, whereas the rear motor is only a 10 horsepower electric motor. The extra horsepower is required to absorb the shock of sudden loading of the cutter as discussed above.

It will thus be seen that the device of the present invention provides a simple and efficient means for reducing or removing the bow in a board. The device can be used in conjunction with the usual planing equipment, or can be used apart from such equipment.

It will of course be understood that the device presented is by way of illustration only, and is meant to be in no way restrictive; therefore, numerous changes and modifications may be made, and the full use of equivalents resorted to without departing from the spirit or scope of the invention as outlined in the appended claims.

I claim:

1. An edge straightening device for straightening the concave side of a bowed board comprising, a guide wall along which the board is moved including first and second fixed sections and an elongate yieldably movable section movable in response to transverse pressure applied to the board and positioned between said fixed sections, cutting means between and immediate said movable section and the second fixed section and having a cutting edge in the plane of said guide wall, said movable section extending substantially from the first fixed section to the cutting means and along which the leading edge of the board slides as it approaches the cutting means, feed means for moving said board longitudinally along said guide wall, and means for transversely urging said board towards the guide wall and positioned adjacent the first fixed section thereby pressing the concave portion of the board towards the first section so that a portion of the board extending across the guide wall will depress the movable section so as to engage and be cut off by the cutting means.

2. An edge straightening device for straightening the concave side of a bowed board comprising, a guide wall along which the board is moved including first and second fixed sections and an elongate movable section movable in response to transverse pressure applied to the board and positioned between said fixed sections, means yieldably urging said movable section toward alignment with the guide wall, cutting means between and immediate said movable section and said second fixed section and having a cutting edge in the plane of said guide wall, feed means for moving said board longitudinally along said guide wall, said movable section extending substantially from the first fixed section to the cutting means and along which the leading edge of the board slides as it approaches the cutting means, and means for urging said board transversely towards the first section for varying the exposure of said cutting means to the board in response to the amount of bow in the board so that the thickness of cut is related thereto.

3. The apparatus of claim 2 including, a planer for receiving the board from the straightener, said planer being aligned with the guide wall.

4. An edge straightening device for reducing the bow in the concave side of a bowed board comprising, a guide wall along which the concave side of the board is moved and including first and second fixed sections and an elongate movable section movable in response to transverse pressure applied to the board and positioned between said fixed sections, feed means for moving said board longitudinally along the guide wall, cutting means between and immediate the movable section and the second fixed section, the outermost cutting edge of said cutting means being in the plane of said fixed sections of the guide wall, said movable section extending substantially from the first fixed section to the cutting means and responsive to lateral motion of the board for allowing a portion of the board to extend laterally across the guide wall, means limiting the movement of the movable section laterally across the guide wall, said first fixed section being substantially shorter than said movable section, and means positioned adjacent said first fixed section for transversely urging the board towards said first fixed section thereby pressing the concave portion of the board toward the first section whereby a portion of the board extending across the guide wall and contacting the movable section will depress the movable section so as to engage and be cut off by the cutting means.

5. An edge straightening device for straightening the concave side of a bowed board comprising, a guide wall along which the concave side of the board is moved, feed means for moving said board longitudinally along said guide wall, said guide wall including in sequence a first movable section, first cutting means, a first fixed section, a second movable section, a second cutting means, and a second fixed section, said first movable section and said second movable section being movable in response to transverse pressure applied to said board, means yieldably urging said first and second movable sections toward alignment with the guide wall, and means for urging the board transversely towards the first fixed section thereby pressing the concave side of the board towards the first and second movable sections and varying the exposure of the first and second cutting means to the board in response to the amount of bow in the board.

6. An edge straightening device for straightening the concave side of an elongate bowed board comprising, a substantially straight guide wall along which the concave side of the board is moved, feed rollers for moving said board longitudinally along said guide wall, said guide wall including in sequence a first movable section, a first cutting means, a first fixed section, a second movable section, a second cutting means, and a second fixed section, said first movable section and said second movable section being movable in response to transverse pressure applied to said board, said first fixed section being substantially shorter than said first and second movable sections, the outermost edge of the cutting means being in the plane of the fixed sections, means yieldably urging said first and second movable sections toward alignment with the guide wall, but responsive to lateral motion of the board for allowing a portion of the board to extend laterally across the guide wall, and means adjacent the first fixed section for urging the concave side of the board towards the guide wall whereby a portion of the board extending laterally beyond the first fixed section and contacting the first and second movable sections will vary the exposure of the first and second cutting means to the board in response to the amount of bow in the board.

7. An edge straightening device for reducing the bow in the concave side of an elongate bowed board comprising, a substantially straight guide wall along which the concave side of the board is moved, feed means for moving said board longitudinally along the guide wall, said guide wall including in sequence a first movable section, a first cutting means, a first fixed section, a second movable section, a second cutting means, and a second fixed section, said first movable section and said second movable section being movable in response to transverse pressure applied to said board, the outermost edge of the cutting means being in the plane of the fixed sections, means yieldably urging said first and second movable sections toward alignment with the guide wall, and normally holding said board out of engagement with said cutters, but responsive to lateral motion of said board for allowing a portion of the board to extend laterally across the guide wall, means limiting the movement of the movable sections laterally across the guide wall, and means longitudinally aligned with the first fixed section for urging the concave side of the board towards the guide wall whereby the outwardly projecting ends of the board will extend laterally beyond the first fixed section and contact and move the first and second movable sections thereby varying the exposure of the first and second cutting means to the board in response to the amount of bow in the board.

8. An edge straightening device for straightening the concave side of a bowed board comprising, first and second fixed sections forming a guide wall along which the board is moved, an elongate movable section yieldably movable away from the plane of the guide wall away from the path of movement of the board, in response to pressure applied transversely to the board, and positioned between said fixed sections, cutting means between said movable section and the second fixed section, said movable section extending substantially from the first fixed section to the cutting means and along which the leading edge of the board slides as it approaches the cutting means, feed means for moving said board longitudinally along and in contact with said guide wall, means for transversely moving said board toward said guide wall and positioned opposite the first fixed section pressing the concave portion of the board against the first section so that any portion of the board extending across the guide wall will depress the movable section beyond the guide wall, said cutting means being laterally positioned so as to extend toward said board for cutting engagement therewith, the extent of said cutting means toward said board being limited to the plane of the fixed sections so as to cut off only portions of the board extending laterally beyond said fixed sections in response to the pressure applied transversely to the board.

References Cited by the Examiner

UNITED STATES PATENTS

| | | | |
|---|---|---|---|
| 183,418 | 10/76 | Rait et al. | 144—253.3 |
| 281,737 | 7/83 | Stevens | 144—117 |
| 347,854 | 8/86 | Wicke | 143—75.1 |
| 918,504 | 4/09 | Burgess | 144—323 |
| 1,764,412 | 6/30 | Melby | 144—323 |
| 2,077,118 | 4/37 | Lewis | 144—323 |
| 2,782,817 | 2/57 | Steiner | 144—117.2 |
| 2,783,796 | 3/57 | Patterson | 144—117.2 |
| 2,851,070 | 9/58 | Hughes | 144—117.2 |
| 2,998,038 | 8/61 | Oller | 144—116 |

FOREIGN PATENTS

| | | |
|---|---|---|
| 371,489 | 3/23 | Germany. |
| 395,058 | 7/33 | Great Britain. |

ROBERT C. RIORDON, *Primary Examiner.*

DONALD R. SCHRAN, WILLIAM W. DYER, JR., LESTER M. SWINGLE, *Examiners.*